(12) United States Patent
Kolych et al.

(10) Patent No.: US 12,425,862 B2
(45) Date of Patent: Sep. 23, 2025

(54) ATTACK DETECTION IN ROUND-TRIP TIMING ESTIMATION

(71) Applicant: Cypress Semiconductor Corporation, San Jose, CA (US)

(72) Inventors: Igor Kolych, Lviv (UA); Claudio Rey, Chandler, AZ (US)

(73) Assignee: Cypress Semiconductor Corporation, San Jose, CA (US)

( * ) Notice: Subject to any disclaimer, the term of this patent is extended or adjusted under 35 U.S.C. 154(b) by 123 days.

(21) Appl. No.: 18/393,259

(22) Filed: Dec. 21, 2023

(65) Prior Publication Data

US 2025/0211990 A1 Jun. 26, 2025

(51) Int. Cl.
*H04W 56/00* (2009.01)
*H04W 12/121* (2021.01)

(52) U.S. Cl.
CPC ...... *H04W 12/121* (2021.01); *H04W 56/0035* (2013.01)

(58) Field of Classification Search
CPC .......................... H04W 12/121; H04W 56/0035
See application file for complete search history.

(56) References Cited

U.S. PATENT DOCUMENTS

| | | | |
|---|---|---|---|
| 7,929,927 B2 | 4/2011 | Norris et al. | |
| 9,794,056 B1 * | 10/2017 | Tamma | H04L 7/042 |
| 10,530,905 B1 | 1/2020 | Rey et al. | |
| 10,819,544 B2 | 10/2020 | Stanciu et al. | |
| 10,862,505 B1 | 12/2020 | Rey et al. | |
| 10,862,728 B1 | 12/2020 | Rey et al. | |
| 10,862,729 B1 | 12/2020 | Rey et al. | |
| 11,545,982 B2 | 1/2023 | Perin et al. | |
| 11,621,898 B2 | 4/2023 | Stanciu et al. | |
| 2024/0357533 A1 * | 10/2024 | Jacobsen | H04W 56/0065 |

FOREIGN PATENT DOCUMENTS

| | | |
|---|---|---|
| EP | 3264701 B1 | 2/2019 |
| EP | 3706380 A1 | 9/2020 |
| EP | 3737055 A1 | 11/2020 |
| EP | 3731478 A3 | 1/2021 |
| EP | 4064568 A1 | 9/2022 |

* cited by examiner

*Primary Examiner* — Brian F Shaw

(57) ABSTRACT

A wireless device includes a receiver adapted with Bluetooth® low energy (BLE) capability and logic at least one of coupled to or integrated within the receiver. The logic determines frequency samples of bits of a predetermined pattern of a packet during a round-trip timing estimation of the packet, wherein the packet is received during a keyless access attempt of an enclosure having a transmitter and the receiver. The logic compares, to a reference frequency sample, the frequency samples of bits of the predetermined pattern. In response to determining a difference between the reference frequency sample and the frequency samples of bits of the predetermined pattern, the logic detects an intrusion associated with the predetermined pattern.

20 Claims, 10 Drawing Sheets

600

ATTACK DETECTION IN ROUND-TRIP TIMING ESTIMATION

TECHNICAL FIELD

This disclosure relates to wireless networks and, more specifically, to improved attack detection in round-trip timing (RTT) estimation.

BACKGROUND

Personal area networks (PANs), such as Bluetooth® (BT), Bluetooth® Low Energy (BLE), Zigbee®, infrared, and the like, provide a wireless connection for various personal, industrial, scientific, and medical applications. PANs generally use a packet-based protocol and have an architecture that includes central devices (CDs) and peripheral devices (PDs). A CD can communicate with multiple PDs over the PAN.

Some PANs, such as those based on BLE technology, have communication ranges similar to BT networks but have considerably smaller power consumption and cost. Further, BLE devices often remain in a sleep mode and transition to an active mode when data communication is about to happen. BLE protocol also supports mesh networking, in which data can flow over multiple paths, and which does not rely on a rigid hierarchical structure of devices, often allowing the same devices to serve as CDs or PDs, depending on particular network conditions and topology.

Additionally, some PANs are used in wireless devices (e.g., CDs) that are included in or associated with lock mechanisms of enclosures (such as a residence, a vehicle, a garage, a shed, or the like) and used to provide secure keyless access to persons in possession of a keyed PD, e.g., also referred to as keyless entry. The wireless CD device, which may also include or be coupled with a mobile device, may transmit a particular data pattern within a frame delimiter of a packet using BLE distance estimation technology. A keyed PD (which could be a mobile device such as a smartphone, for example) may estimate arrival time and return a particular data pattern within a frame delimiter of a packet using BLE distance estimation technology, e.g., in order to estimate round-trip timing (RTT) of packets. The wireless CD device may estimate an arrival time of the returned packet. The wireless devices may perform frame synch detection to verify that the particular data pattern matches an expected data pattern used to, in part, provide a level of security to the keyless entry based on distance ranging. This RTT-based ranging is susceptible to attack at least partially due to being able to be spoofed in certain ways of measuring, including a ranging technique.

DETAILED DESCRIPTION

Figure 1A:
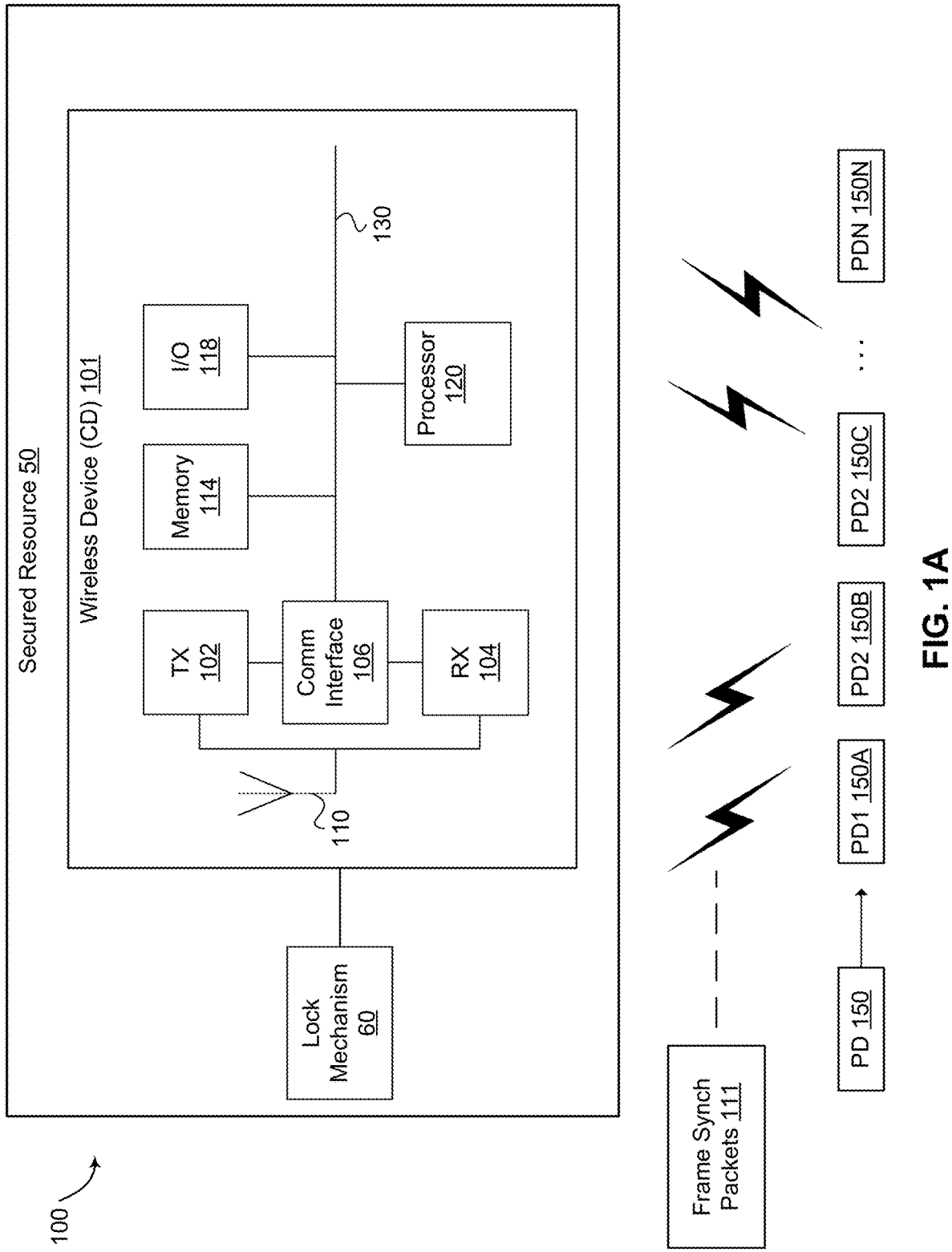
FIG. 1A is a block diagram of a system useable for improved attack detection in round-trip timing (RTT) estimation between a wireless device acting as a transmitter and a wireless device acting as a receiver, according to at least one embodiment.

The following description sets forth numerous specific details such as examples of specific systems, devices, components, methods, and so forth, in order to provide a good understanding of various embodiments of frame synchronization detection between wireless devices associated with a PAN. The disclosed principles may generally be applied to (Gaussian) Frequency Shift Keying ((G)FSK) modulation or (Binary) Phase Shift Keying ((B)PSK) modulation. Frame synchronization (or frame synch) detection may refer to detecting a portion of a packet, such as payload data or a frame delimiter, also referred to as a start frame delimiter (SFD), that identifies or signals that data is to follow within a frame of the packet.

In certain PAN devices, frame synchronization detection can be used to aid in communication between wireless devices by identifying or signaling the data (i.e., payload data) that is to follow in a packet. Optionally, frame synchronization can also identify the sender of the packet. In certain PAN devices, frame synchronization or frame synchronization with data can be used as part of BLE distance estimation. BLE distance estimation is achieved through a phase-based distance ranging method, through packet exchanges in round-trip timing (RTT) estimation, or a combination thereof to provide localization between wireless devices. In one example, data patterns (e.g., a sequence of digital "0s" and "1s") are used in RTT estimation to estimate the time of arrival (ToA) of a packet. In another example, data patterns are used in RTT estimation to estimate the time of departure (ToD) of a packet. In another example, BLE distance estimation can use the frequency estimated during the RTT estimation to synchronize the BLE distance estimation device to other BLE distance estimation devices through the correction of clocking errors and to estimate the frequency offset between devices. Additionally, BLE distance estimation can use data patterns to estimate frequency for use in security features, such as intrusion detection models. As such, there is a need for improved security features for BLE distance estimation devices.

As discussed above, RTT-based ranging techniques employed for security can be spoofed and are thus susceptible to attack. For example, RTT-based ranging can be spoofed by an attacker (such as a man in the middle) using a method known as early commit late detect (ECLD) or early detect late commit (EDLC). In an ECLD spoof, an attacker device guesses at each symbol of the data pattern bits before they are intercepted from the transmitter that is attempting to access an enclosure or resource secured by one of the coupled devices. The attacker device then detects the symbol, and, if the guess is incorrect, changes the symbol before ending transmission of the symbol to the receiver to still perform frame synch detection using the symbol. In an EDLC spoof, an attacker device detects each symbol as early as possible and changes the symbol quickly to compensate for the latency of the detection. Upon the receiver detecting a matching data pattern (along with other spoofed information checking out), the attacker device can gain access to the enclosure. Certain security techniques have been used to address spoofing, such as obfuscation (e.g., increasing the noise level of a transmitted signal, transmitting a packet with a companion signal in an adjacent frequency to confuse potential intruders, etc.), adding a security signature to a transmitted signal, embedding traps within a packet to enhance detectability, creating a small frequency offset that is difficult for potential intruders to detect. However, these security techniques are often insufficient to prevent intrusion, can require prior agreements between the transmitter and receiver devices in order for the receiver device to identify the security signature or other security techniques used, can reduce range by increasing noise and embedding traps, or can require hardware modification, which can make them costly to implement. Thus, an additional layer of security is sought to ensure access to the enclosure is secured and that attacks can be detected, despite other spoofing techniques.

Accordingly, to resolve the security vulnerabilities associated with BLE distance estimation employing RTT-based ranging techniques and to improve attack detection, the present disclosure involves a transmitter and a receiver, and related systems and methods, that compare the frequency and/or in-phase quadrature (IQ) samples of a transmitted signal to a reference frequency sample in order to determine whether there was an intrusion (e.g., attack), according to various embodiments. For example, in some embodiments, a wireless device (e.g., a receiving device) includes receiving logic coupled to or integrated within a receiver of the wireless device. This receiving logic is adapted to receive bits within a predetermined pattern (e.g., a frame synch pattern) of a packet transmitted (e.g., by a transmission device) during a round-trip timing estimation of the packet and/or a keyless access attempt of an enclosure. The receiving logic can determine frequency samples of bits within the frame synch pattern. The receiving logic can compare, to a reference frequency sample, the frequency samples of bits. For example, the receiving logic can compute a reference frequency sample for use in detecting the presence of higher or lower frequencies relative to expected (e.g., reference) frequency samples of the bits within the frame synch pattern. In another example, the receiving logic can use pattern recognition to detect modifications of the frequency samples of bits within the frame synch pattern to expected frequency values and correlate the modifications of the frequency values to a pre-computed attack pattern. Based on the comparison, the receiving logic can then determine whether there has been an intrusion attempt of the frame synch pattern. Further, according to various embodiments, the receiving logic in one of the coupled devices can then enable access to an enclosure (or resource) protected by the receiving device. Access is provided if an intrusion attempt is not detected. In some embodiments, the receiving device can detect an intrusion of the frame synch pattern and send a notification (e.g., a report, message, packet, etc.) that identifies the intrusion to the transmission device.

The present disclosure includes a number of advantages, including the ability to add additional aspects of security to distance estimations (e.g., the RTT-based ranging of BLE), which can be used to provide secure access to resources such as enclosures (e.g., a building or a vehicle), devices and/or device functionality, software, and any other resources to which any type of access or control is desired. In addition, the present disclosure involves small changes to existing infrastructure, thus avoiding the cost increases associated with other security techniques.

FIG. 1A is a block diagram of a system 100 useable for providing improved attack detection in round-trip timing (RTT) estimation between a wireless device 150 and a wireless device 101, according to an example embodiment. The wireless device 101 can act as a transmitter to set transmission time, and the wireless device 150 can act as a receiver, according to an example embodiment. In some embodiments, the wireless device 101 can act as a receiver to detect reception time, and the wireless device 150 can act as a transmitter. The difference between the reception time and the transmission time can be referred to as round-trip timing, which is described in further detail with respect to FIG. 1B. The system 100 can include a secured resource 50, e.g., that is secured using a lock mechanism 60, where the wireless device 150 is adapted to gain access to the secured resource 50 via the lock mechanism 60. The secured resource 50 can be, for example, an enclosure such as a vehicle, a building, a residence, a garage, a shed, a vault, or the like. The secured resource 50 can also be a computer system, industrial equipment, or other items requiring secured access via the lock mechanism 60, which can be a digital locking mechanism, for example. In some embodiments, the lock mechanism 60 is integrated together with the wireless device 101.

In various embodiments, the wireless device 150 is any one of multiple peripheral wireless devices PD1 150A . . . PDN 150N, as the wireless device 101 can be adapted to communicate with any or all of the peripheral wireless devices PD1 150A . . . PDN 150N. In differing embodiments, the wireless device 150 is a mobile device such as a mobile phone, a smart phone, a pager, an electronic transceiver, a tablet, or the like. In these embodiments, the wireless device 150 can be adapted to gain access to the secured resource 50 by transmitting data, including a frame delimiter and an enclosed frame. In some embodiments, the frame is encapsulated in a frame synch packet, and one or more frame synch packets 111 can be transmitted from the wireless device 150 to the wireless device 101. While the wireless device 101 is illustrated in detail, the wireless device 150 can also include the same or similar components as the wireless device 101, but are not repeated for simplicity. There can be transmission-reception symmetry between two wireless devices (however, the wireless device 150 is considered as a transmitter, and the wireless device 101 is considered as a receiver for simplification purposes).

In at least some embodiments, the wireless device 101 includes, but is not limited to, a transmitter 102 or TX (e.g., a PAN transmitter), a receiver 104 or RX (e.g., a PAN receiver), a communications interface 106, one or more antenna 110, a memory 114, one or more input/output (I/O) devices 118 (such as a display screen, a touch screen, a keypad, and the like), and a processor 120. These components can all be coupled to a communications bus 130.

In some embodiments, a separate antenna is employed for each of the transmitter 102 and receiver 104, and so the antenna 110 is illustrated for simplicity. In at least some embodiments, the memory 114 can include storage to store instructions executable by the processor 120 and/or data generated by the communication interface 106. In various embodiments, frontend components such as the transmitter 102, the receiver 104, the communication interface 106, and the one or more antenna 110 described herein within various devices may be adapted with or configured for PAN-based frequency bands, e.g., Bluetooth® (BT), BLE, Wi-Fi®, Zigbee®, Z-wave™, and the like.

In some embodiments, the communications interface 106 is integrated with the transmitter 102 and the receiver 104, e.g., as an RF front-end (RFFE) circuitry of the wireless device 101. The communication interface 106 may coordinate, as directed by the processor 120, to request/receive packets from the peripheral wireless device 150. The communications interface 106 can further process data symbols received by the receiver 104 in a way that the processor 120 can perform further processing, including verifying correlation between phase-based samples of data values obtained from a frame of a packet and an expected data pattern as part of a security protocol, as discussed herein.

Figure 1B:
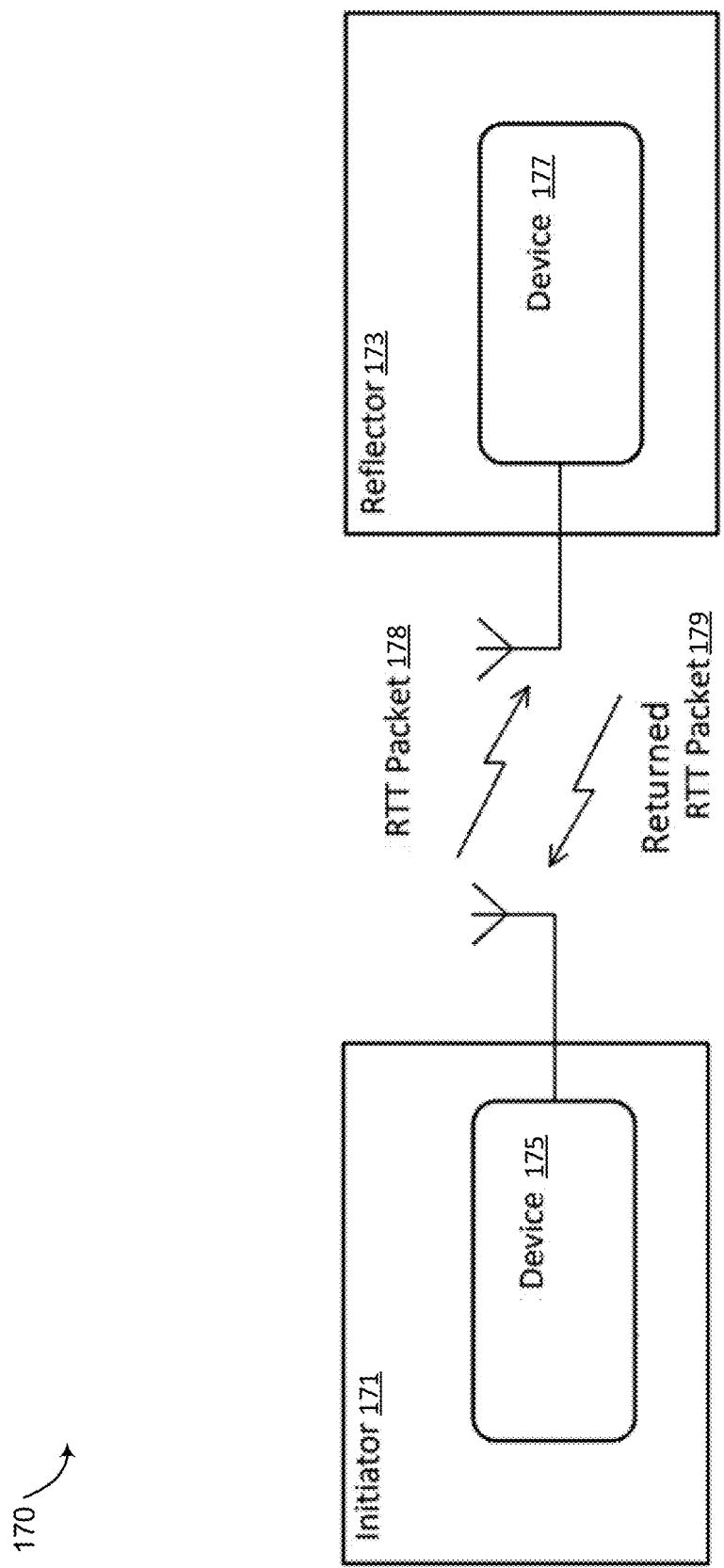
FIG. 1B is a simplified block diagram illustrating the sending and receiving of packets during RTT estimation between a wireless device acting as a transmitter and a wireless device acting as a receiver, according to at least one embodiment.

FIG. 1B is a simplified block diagram 170 illustrating the sending and receiving of packets during RTT estimation between a wireless device 175 acting as an initiator 171 (e.g., a CD) and a wireless device 177 acting as a reflector 173 (e.g., a PD), according to at least one embodiment. In some embodiments, the initiator 171 can send (e.g., transmit) a packet 178 to the reflector 173. The reflector 173 can receive the packet 178 and can, for example, estimate arrival time of the packet 178. The reflector 173 can return a different packet 179 to the initiator 171 after a defined period from the arrival time. The initiator 171 can receive the returned packet 179 and can, for example, estimate arrival time of the returned packet 179. The initiator 171 can estimate time of flight (or round-trip timing) by subtracting times of sending and receiving events to estimate distance between the wireless device 175 and the wireless device 177, etc. Intrusion detection is performed on both devices.

Figure 2:
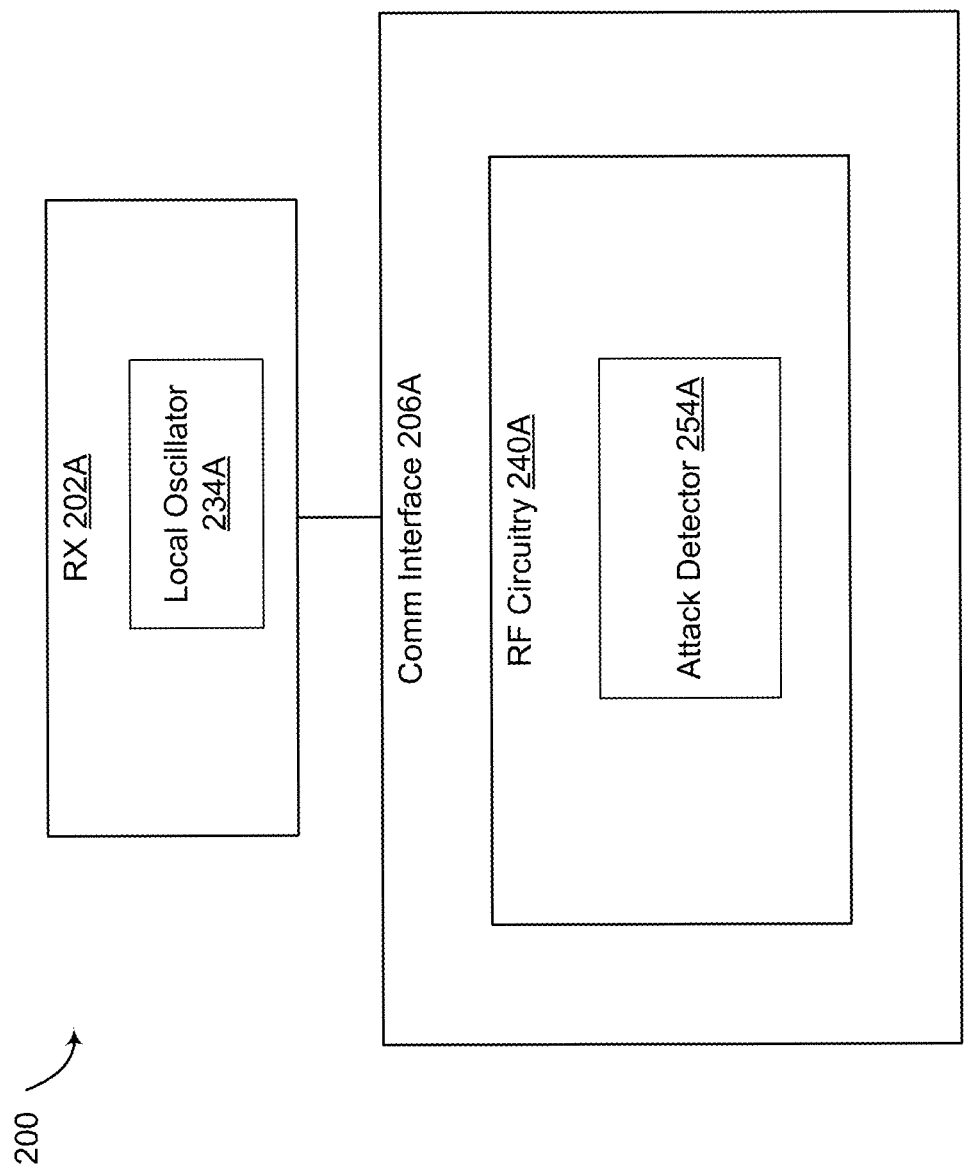
FIG. 2 is a simplified block diagram of the communication interface of a wireless device, according to at least one embodiment.

FIG. 2 is a simplified block diagram of the wireless device 101 and/or 150A of FIG. 1A that acts in receiver mode, according to at least one embodiment. Recall that the components of the wireless device 101 of FIG. 1A can also be included in the wireless devices 150A... 150N of FIG. 1A. Thus, the wireless device 101 can include a receiver 202A and a communication interface 206A adapted with Bluetooth® low energy (BLE) distance estimation capability. In various embodiments, the receiver 202A includes a local oscillator (LO) 234A to receive packets transmitted at a particular frequency associated with a channel. The communication interface 206A can direct the receiver 202A to receive frame synch packets at the particular frequency in order to establish a secure wireless connection with the wireless device 150A.

In these embodiments, the communication interface 206A includes RF circuitry 240A, which in turn includes logic such as an attack detector 254A. In some embodiments, the logic of the RF circuitry 240A is at least one of coupled to or integrated within the receiver 202A.

In at least one embodiment, the attack detector 254A receives bits within a predetermined pattern (e.g., a frame synch pattern) of a packet 111 transmitted during a round-trip timing estimation of the packet 111 and/or a keyless access attempt of the resource 50. The attack detector 254A can determine frequency samples of received bits within the frame synch pattern. The attack detector 254A or other logic of the RF circuitry 240A can compare, to a reference frequency sample, the frequency samples of received bits. The attack detector 254A can then determine whether there has been an intrusion attempt of the frame synch pattern. Further, according to various embodiments, the attack detector 254A can then enable access to an enclosure (or resource 50) protected by the receiver 202A. Access is provided if an intrusion attempt is not detected. In some embodiments, the attack detector 254A can detect an intrusion of the frame synch pattern and send a notification (e.g., a report, message, packet, etc.) that identifies the intrusion to the transmitting wireless device 150A.

In some embodiments, the RF circuitry 240A is implemented as a programmable processor, such as an application-specific integrated circuit (ASIC), field programmable gate array (FPGA), a processing unit (such as a CPU or a GPU), or other microprocessor device that can include a combination of circuit-based hardware, logic, firmware, and/or software.

Figure 3:
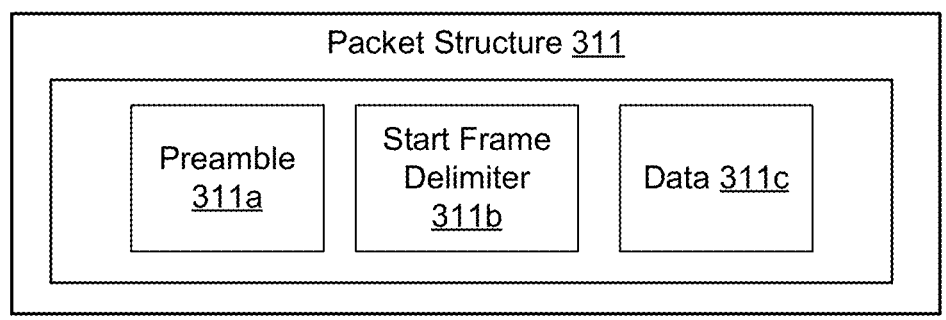
FIG. 3 is a simplified block diagram illustrating a packet structure of a wireless device, according to at least one embodiment.

FIG. 3 is a simplified block diagram illustrating a packet structure 311 received from a wireless device (e.g., the wireless device 150 in FIG. 1A), in accordance with some implementations. As illustrated in FIG. 3, the packet structure 311 can include, but is not limited to, a preamble 311a, a start frame delimiter 311b, and data 311c. The preamble 311a is typically a fixed number of bytes (e.g., seven bytes) that indicate or identify that data is to follow within a frame of a packet received by a receiver (e.g., the receiver 104 of FIG. 1A). The preamble 311a allows wireless devices (e.g., the wireless device 101 of FIG. 1A) to synchronize their receiver clocks with the transmitter clocks of wireless devices (e.g., the wireless device 150 in FIG. 1A). The start frame delimiter 311b is typically another fixed number of bytes (e.g., one byte) that indicates the end of the preamble 311a and the start of the frame with payload data (e.g., the data 311c).

Figure 4A:
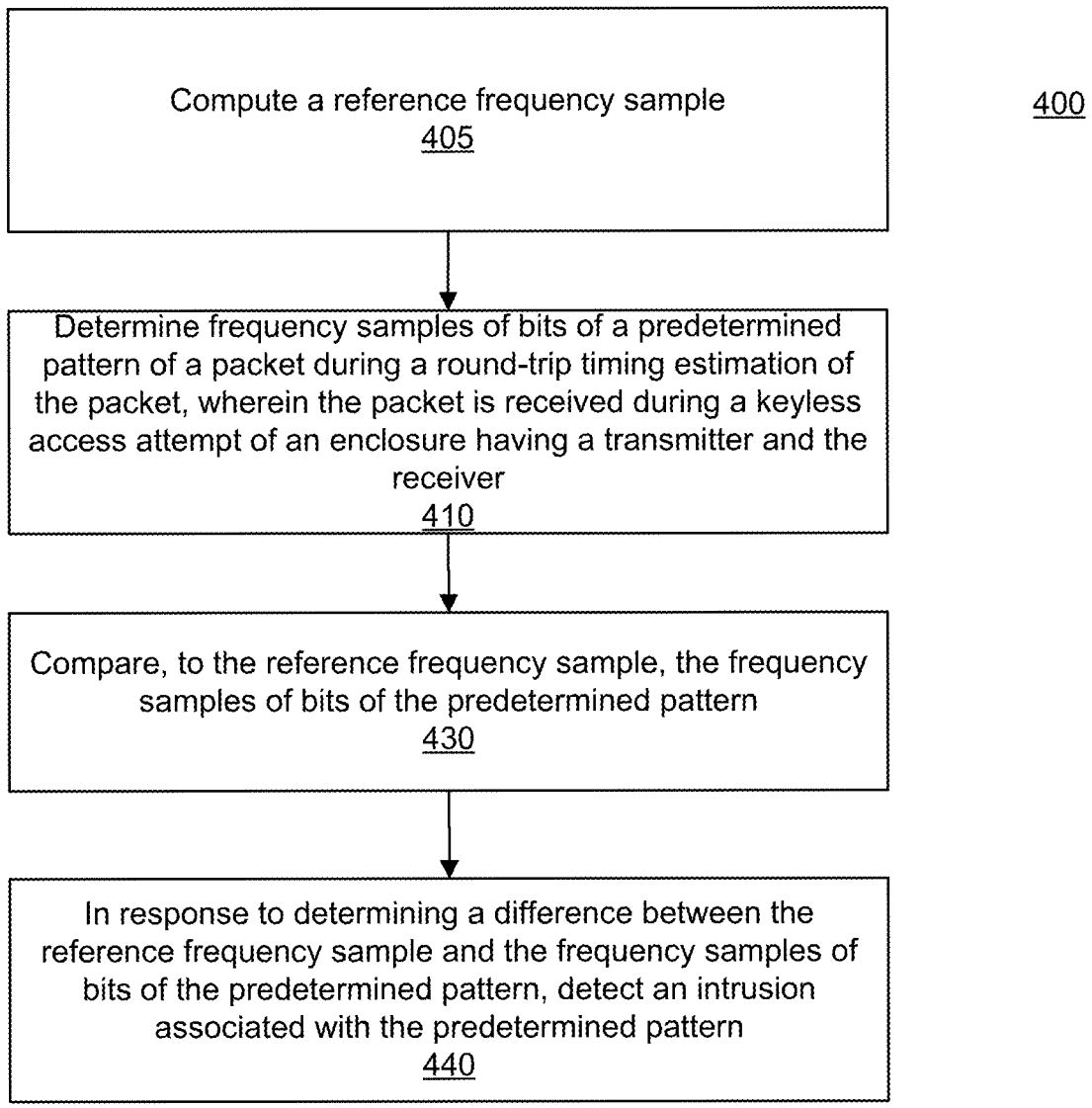
FIG. 4A is a flow diagram of a method of comparing the frequency of a received (e.g., measured) signal to the frequency of a reference signal for improved attack detection in round-trip timing (RTT) estimation, according to at least one embodiment.

FIG. 4A is a flow diagram of a method 400 of comparing the frequency of a received (e.g., measured) signal to the frequency of a reference signal for improved attack detection in round-trip timing (RTT) estimation, according to various embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the receiver 104 (e.g., as illustrated in FIG. 1A).

At operation 405, the processing logic computes a reference frequency sample based on a frequency sample of reference bits (referred to herein as "reference frequency sample" or "reference frequency samples"). In some embodiments, the processing logic can receive the reference frequency sample in an agreement transmitted to a receiver (e.g., the receiver 104 of FIG. 1A) (e.g., transmitted from the transmission device 102 of FIG. 1A). The reference frequency sample can be an expected frequency sample of bits within a predetermined pattern (e.g., a frame synchronization pattern) embedded within a packet (e.g., the packet illustrated in FIG. 3), which can be computed and stored on the receiver and/or the transmission device. In some embodiments, the agreement can be another packet, a notification, a message, etc., that includes information about the reference frequency sample and/or the predetermined pattern.

In an example, the reference frequency sample can be computed using an example mathematical equation, such as:

$$f_r = \text{angle}(\{r_n\}) - \text{angle}(\{r_{n-6}\}),$$

where $f_r$ is the reference FM frequency value and $r_n$ is reference IQ data.

In another example, the reference frequency sample can be computed using an example mathematical equation, such as:

$$f_r = \text{angle}(\{r_n\}) - \text{angle}(\{r_{n-4}\}).$$

Figure 5:
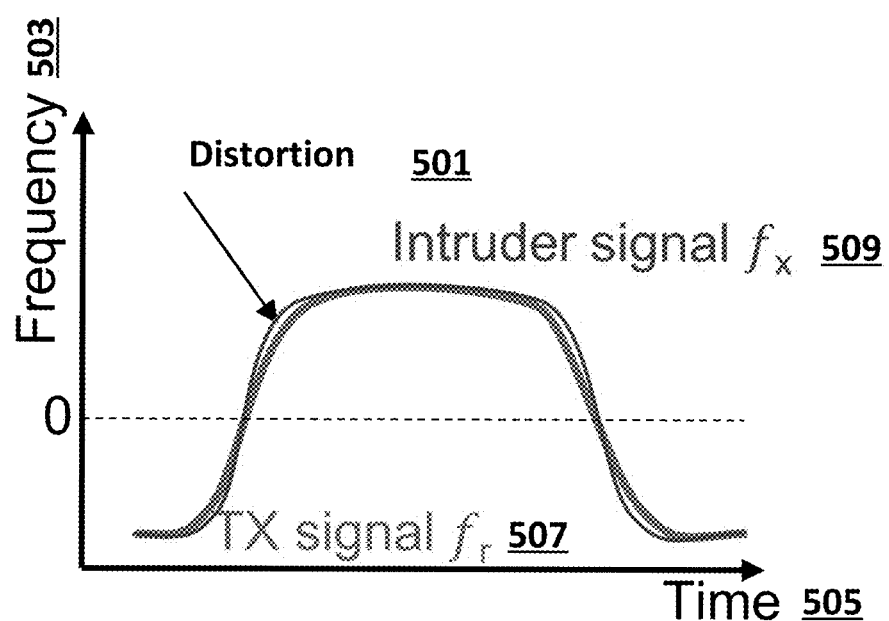
FIG. 5 is a simplified graph illustrating the frequency of a transmitted signal over time, according to at least one embodiment.

As illustrated in FIG. 5, the reference frequency sample $f_r$ can be a frequency 507.

At operation 410, the processing logic determines frequency samples of bits within the predetermined pattern during a round-trip timing estimation of the packet. In some embodiments, the predetermined pattern is received as part of the packet during a keyless access attempt of a resource (e.g., the secured resource 50 of FIG. 1A) having a receiver (e.g., the receiver 104 of FIG. 1A). In some embodiments, the predetermined pattern is transmitted by a transmission device (e.g., transmitter) (e.g., the transmitter 102 of FIG. 1A). The processing logic can receive the predetermined pattern as part of the packet transmitted by the transmission device.

In some embodiments, to determine the frequency samples of bits within the predetermined pattern of the packet, the processing logic can extract frequency modulation (FM) sampled data from in-phase quadrature (IQ) data within the packet. The processing logic can detect the predetermined pattern within the packet (e.g., by looking for a peak using reference FM sampled data).

In an example, the processing logic can determine the frequency samples of bits within the predetermined pattern using an example mathematical equation, such as:

$$f_x = \text{angle}(\{x_n\}) - \text{angle}(\{x_{n-6}\}),$$

where $f_x$ is the frequency samples of bits within the predetermined pattern and $x_n$ is the IQ data within the predetermined pattern.

In another example, the processing logic can determine the frequency samples of bits within the predetermined pattern using an example mathematical equation, such as:

$$f_x = \text{angle}(\{x_n\}) - \text{angle}(\{x_{n-4}\}).$$

As illustrated in FIG. 5, the frequency $f_x$ of the FM sampled bits within the predetermined pattern can be a frequency 509.

At operation 430, the processing logic compares the frequency samples of bits within the predetermined pattern (e.g., the frequency determined at operation 410) to the reference frequency sample computed at operation 405.

In some embodiments, to compare the received frequency samples to the reference frequency samples, the processing logic can compute a frequency metric. For example, the processing logic can compute a sum (e.g., a first sum) of the absolute value of the frequency samples of the received bits within the predetermined pattern. The processing logic can compute another sum (e.g., a second sum) of the absolute value of the reference frequency samples. In some embodiments, the second sum of the absolute value of the reference frequency samples is pre-computed and can be stored on the receiver and/or transmission device. The second sum of the absolute values of the reference frequency samples can be received along with the reference frequency samples in the agreement transmitted to the receiver. The processing logic can then compute a value representing a difference between the second sum and the first sum. As illustrated in FIG. 5, the value representing the difference between the second sum and the first sum to detect distortion 501. In some embodiments, the processing logic can compute a number of "zero" crossings for normalization. In some embodiments, the number of "zero" crossings for normalization is pre-computed and can be stored on the receiver and/or transmission device. The number of "zero" crossings for normalization can be received along with the second sum of the absolute value of the reference frequency samples in the agreement transmitted to the receiver. In an example, the processing logic can compute the frequency metric using an example mathematical equation, such as:

$$S_{\to 0} = \frac{1}{N_{\to 0}}\left(\sum |f_x| - \sum |f_r|\right),$$

where $S_{\to 0}$ is the reference frequency sample, $N_{\to 0}$ is the number of "zero" crossings for normalization, $f_x$ is the frequency samples of bits within the predetermined pattern, and $f_r$ is the reference frequency value.

In some embodiments, the processing logic can omit the computation of the number of "zero" crossings for normalization when computing the reference frequency sample. In an example, the processing logic can compute the frequency metric, S, using an example mathematical equation, such as:

$$S = \left(\sum |f_x| - \sum |f_r|\right).$$

In some embodiments, the processing logic can compute the frequency metric using squared values or other polynomial values of the received frequency samples and/or the reference frequency samples. For example, the processing logic can compute the frequency metric using an example mathematical equation, such as:

$$S_{\to 0} = \frac{1}{N_{\to 0}}\left(\sum |f_x|^2 - \sum |f_r|^2\right).$$

In some embodiments, the processing logic can compute a frequency metric for each of a set of packets (e.g., 5 packets) received. The processing logic can then compute an average of each frequency metric for each packet of the set of packets. The processing logic can then use the average frequency metric to compare to the frequency samples of bits within the predetermined pattern, as described above.

In some embodiments, in response to computing the frequency metric, the processing logic can determine whether the frequency metric meets or exceeds a first threshold value or is less than a second threshold value. The first threshold value can be a high-frequency threshold. The second threshold value can be a low-frequency threshold.

In some embodiments, comparing the received frequency samples to the reference frequency samples can include using pattern recognition to detect modifications (e.g., distortion 501 as illustrated in FIG. 5) of the frequency samples of bits within the predetermined pattern. For example, the processing logic can compute a value representing a difference between received frequency samples and the reference frequency samples. For example, the processing logic can compute the value, Δf, using an example mathematical equation, such as:

$$\Delta f = f_x - f_r,$$

where $f_x$ is the frequency samples of the received bits within the predetermined pattern, and $f_r$ is the frequency samples of the reference bits within the predetermined pattern.

Figure 6A:
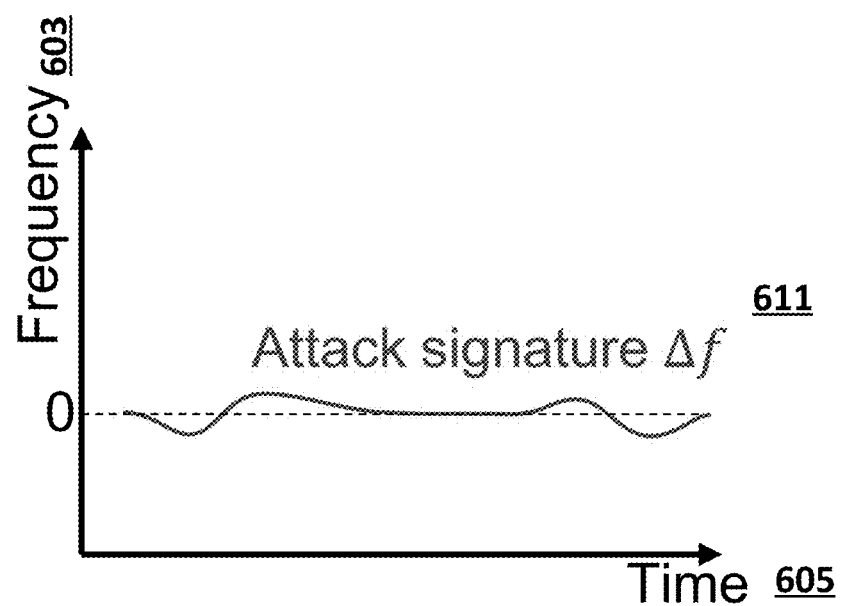
FIG. 6A is a simplified graph illustrating the frequency of an attack pattern signal over time, according to at least one embodiment.

As illustrated in FIG. 5 the frequency samples $f_x$ of the received bits within the predetermined pattern can be a frequency 509. The reference frequency samples $f_r$ can be a frequency 507. As illustrated in FIG. 6A, the value Δf representing the difference between the frequency samples of the bits within the predetermined pattern and the reference frequency value can be referred to as an attack signature 611 (also shown as distortion 501 in FIG. 5).

In response to computing the above values, the processing logic can perform a correlation between an attack pattern and the values representing the difference between received frequency samples and the reference frequency samples. In some embodiments, the attack pattern can be pre-computed and can be stored on the receiver and/or the transmission device. In some embodiments, the processing logic can receive the attack pattern in an agreement transmitted to the receiver (e.g., transmitted from the transmission device). In some embodiments, the agreement can be another packet, a notification, message, etc., that includes information about the attack pattern, the reference frequency samples, and/or the predetermined pattern. For example, the processing logic can compute the correlation using an example mathematical equation, such as:

$$c_j = \Delta f \cdot p_j,$$

where $c_j$ is the correlation value, Δf is the value representing the difference between received frequency samples and the reference frequency samples, and $p_j$ is the attack pattern described above.

Referring to FIG. 6C, the attack pattern $p_j$ can be illustrated as attack pattern 613.

At operation 440, the processing logic detects an intrusion associated with the predetermined pattern. In some embodiments, the processing logic detects the intrusion in response to determining a difference between the reference frequency sample and the frequency samples of bits of the predetermined pattern. For example, in response to determining at operation 430 that the computed value representing the difference between the second sum and the first sum is greater than the first threshold value, the processing logic can determine that the intrusion is a high pass filter intrusion. In some embodiments, in response to determining at operation 430 that the computed value representing the difference between the second sum and the first sum is less than the second threshold value, the processing logic can determine that the intrusion is one of: an early commit late detect (ECLD) intrusion or an early detect late commit (EDLC) intrusion, as described above. In some embodiments, in response to determining that the computed value representing the difference between the second sum and the first sum is less than or equal to the first threshold value and/or greater than or equal to the second threshold value, the processing logic can determine that there is no intrusion.

In some embodiments, in response to detecting the intrusion, the processing logic (e.g., the receiver) can send a notification (e.g., report, message, packet, etc.) to the transmission device, where the notification indicates that an intrusion associated with the predetermined pattern was detected by the receiver.

Figure 4B:
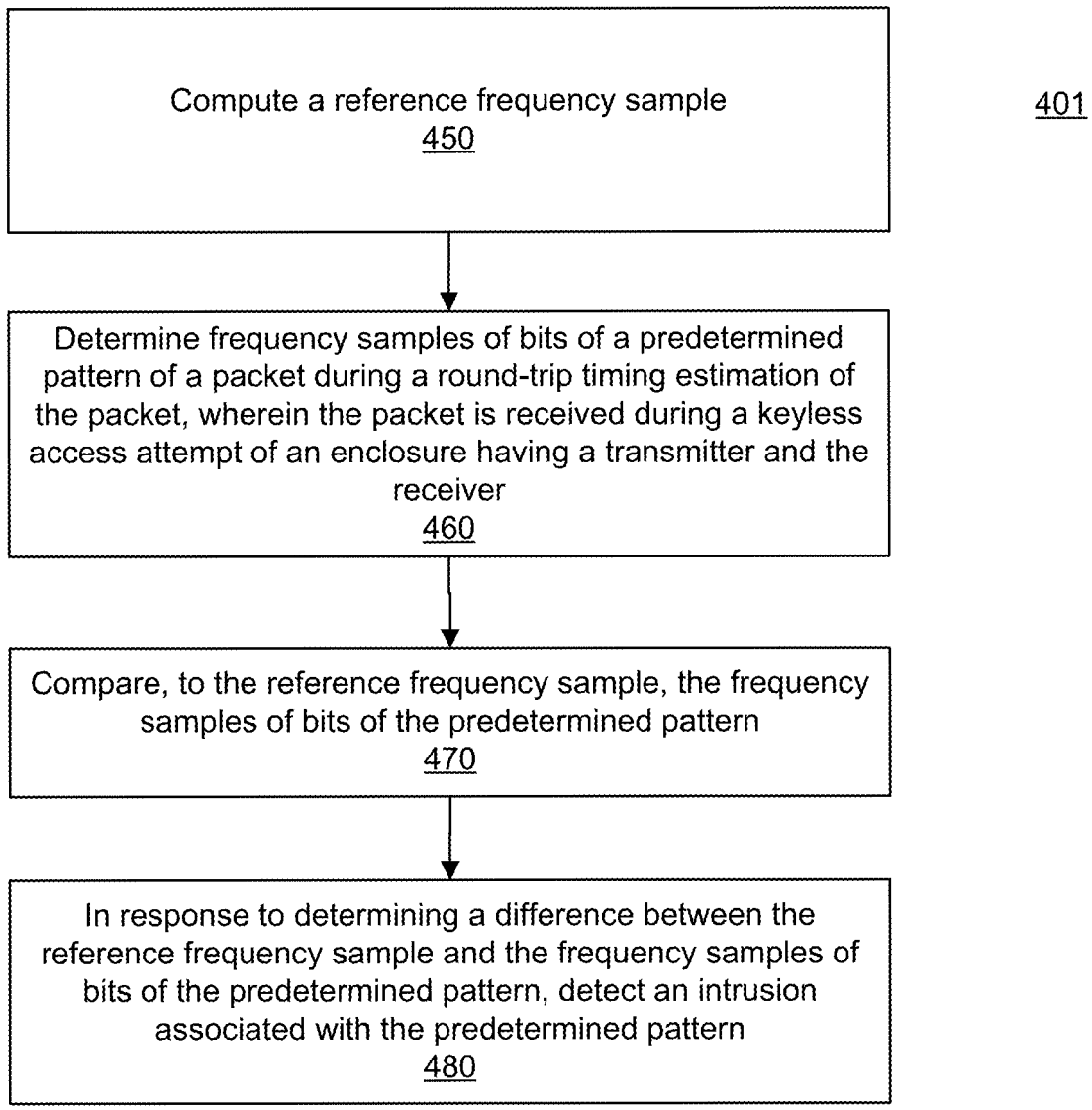
FIG. 4B is a flow diagram of a method of comparing the frequency of a received (e.g., measured) signal to the frequency of a reference signal for improved attack detection in round-trip timing (RTT) estimation, according to at least one embodiment.

FIG. 4B is a flow diagram of a method 401 of comparing the frequency of a received (e.g., measured) signal to the frequency of a reference signal for improved attack detection in round-trip timing (RTT) estimation, according to various embodiments. The method 401 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 401 is performed by the receiver 104 (e.g., as illustrated in FIG. 1A).

At operation 450, the processing logic computes a reference frequency sample based on frequency samples of reference bits (referred to herein as "reference frequency sample" or "reference frequency samples"). In some embodiments, the processing logic can receive the reference frequency sample in an agreement transmitted to a receiver (e.g., the receiver 104 of FIG. 1A) (e.g., transmitted from the transmission device 102 of FIG. 1A). The reference frequency sample can be an expected frequency sample of bits within a predetermined pattern (e.g., a frame synchronization pattern) embedded within a packet (e.g., the packet illustrated in FIG. 3), which can be computed and stored on the receiver and/or the transmission device. In some embodiments, the agreement can be another packet, a notification, a message, etc., that includes information about the reference frequency sample and/or the predetermined pattern.

In an example, the reference frequency sample can be computed using an example mathematical equation, such as:

$$f_r = \text{angle}(\{r_n\}) - \text{angle}(\{r_{n-6}\}),$$

where $f_r$ is the reference FM frequency value and $r_n$ is reference IQ data.

In another example, the reference frequency sample can be computed using an example mathematical equation, such as:

$$f_r = \text{angle}(\{r_n\}) - \text{angle}(\{r_{n-4}\}).$$

As illustrated in FIG. 5, the reference frequency sample $f_r$ can be a frequency 507.

At operation 460, the processing logic determines frequency samples of bits within the predetermined pattern during a round-trip timing estimation of the packet. In some embodiments, the predetermined pattern is received as part of the packet during a keyless access attempt of a resource (e.g., the secured resource 50 of FIG. 1A) having a receiver (e.g., the receiver 104 of FIG. 1A). In some embodiments, the predetermined pattern is transmitted by a transmission device (e.g., transmitter) (e.g., the transmitter 102 of FIG. 1A). The processing logic can receive the predetermined pattern as part of the packet transmitted by the transmission device.

In some embodiments, to determine the frequency samples of the bits within the predetermined pattern of the packet, the processing logic can extract frequency modulation (FM) sampled data from in-phase quadrature (IQ) data within the packet. The processing logic can detect the predetermined pattern within the packet (e.g., by looking for a peak using reference FM sampled data).

In an example, the processing logic can determine the frequency samples of bits within the predetermined pattern using an example mathematical equation, such as:

$$f_x = \text{angle}(\{x_n\}) - \text{angle}(\{x_{n-6}\}),$$

where $f_x$ is the frequency sample of bits within the predetermined pattern and $x_n$ is the IQ data within the predetermined pattern.

In another example, the processing logic can determine the frequency samples of bits within the predetermined pattern using an example mathematical equation, such as:

$$f_x = \text{angle}(\{x_n\}) - \text{angle}(\{x_{n-4}\}).$$

As illustrated in FIG. 5, the frequency $f_x$ of the FM sampled bits within the predetermined pattern can be a frequency 509.

At operation 470, the processing logic compares the frequency samples of bits within the predetermined pattern (e.g., the frequency determined at operation 460) to the reference frequency sample computed at operation 450.

In some embodiments, to compare the received frequency samples to the reference frequency samples, the processing logic can compute the frequency metric. For example, the processing logic can compute a sum (e.g., a first sum) of the absolute value of the frequency samples of the received bits within the predetermined pattern. The processing logic can compute another sum (e.g., a second sum) of the absolute value of the reference frequency samples. In some embodiments, the second sum of the absolute value of the reference frequency samples is pre-computed and can be stored on the receiver and/or transmission device. The second sum of the absolute values of the reference frequency samples can be received along with the reference frequency samples in the agreement transmitted to the receiver. The processing logic can then compute a value representing a difference between the second sum and the first sum. As illustrated in FIG. 5, the value representing the difference between the second sum and the first sum to detect distortion 501. In some embodiments, the processing logic can compute a number of "zero" crossings for normalization. In some embodiments, the number of "zero" crossings for normalization is pre-computed and can be stored on the receiver and/or transmission device. The number of "zero" crossings for normalization can be received along with the second sum of the absolute value of the reference frequency samples in the agreement transmitted to the receiver. In an example, the processing logic can compute the frequency metric using an example mathematical equation, such as:

$$S_{\to 0} = \frac{1}{N_{\to 0}} (\sum |f_x| - \sum |f_r|),$$

where $S_{\to 0}$ is the reference frequency sample, $N_{\to 0}$ is the number of "zero" crossings for normalization, $f_x$ is the frequency samples of bits within the predetermined pattern, and $f_r$ is the reference frequency value.

In some embodiments, the processing logic can omit the computation of the number of "zero" crossings for normalization when computing the frequency metric. An example, the processing logic can compute the frequency metric, S, using an example mathematical equation, such as:

$$S = (\sum |f_x| - \sum |f_r|).$$

In some embodiments, the processing logic can compute the frequency metric using squared values or other polynomial values of the received frequency samples and/or the reference frequency samples. For example, the processing logic can compute the frequency metric using an example mathematical equation, such as:

$$S_{\to 0} = \frac{1}{N_{\to 0}} (\sum |f_x|^2 - \sum |f_r|^2).$$

In some embodiments, the processing logic can compute a frequency metric for each of a set of packets (e.g., 5 packets) received. The processing logic can then compute an average of each frequency metric for each packet of the set of packets. The processing logic can then use the average frequency metric to compare to the frequency samples of bits within the predetermined pattern, as described above.

In some embodiments, in response to computing the frequency metric, the processing logic can determine whether the frequency metric meets or exceeds a first threshold value or is less than a second threshold value. The first threshold value can be a high-frequency threshold. The second threshold value can be a low-frequency threshold.

At operation 480, the processing logic detects an intrusion associated with the predetermined pattern. In some embodiments, the processing logic detects the intrusion in response to determining a difference between the reference frequency sample and the frequency samples of bits of the predetermined pattern. For example, in response to determining at operation 470 that the computed value representing the difference between the second sum and the first sum is greater than the first threshold value, the processing logic can determine that the intrusion is a high pass filter intrusion. In some embodiments, in response to determining at operation 470 that the computed value representing the difference between the second sum and the first sum is less than the second threshold value, the processing logic can determine that the intrusion is one of: an early commit late detect (ECLD) intrusion or an early detect late commit (EDLC) intrusion, as described above. In some embodiments, in response to determining that the computed value representing the difference between the second sum and the first sum is less than or equal to the first threshold value and/or greater than or equal to the second threshold value, the processing logic can determine that there is no intrusion.

In some embodiments, in response to detecting the intrusion, the processing logic (e.g., the receiver) can send a notification (e.g., report, message, packet, etc.) to the transmission device, where the notification indicates that an intrusion associated with the predetermined pattern was detected by the receiver.

Figure 4C:
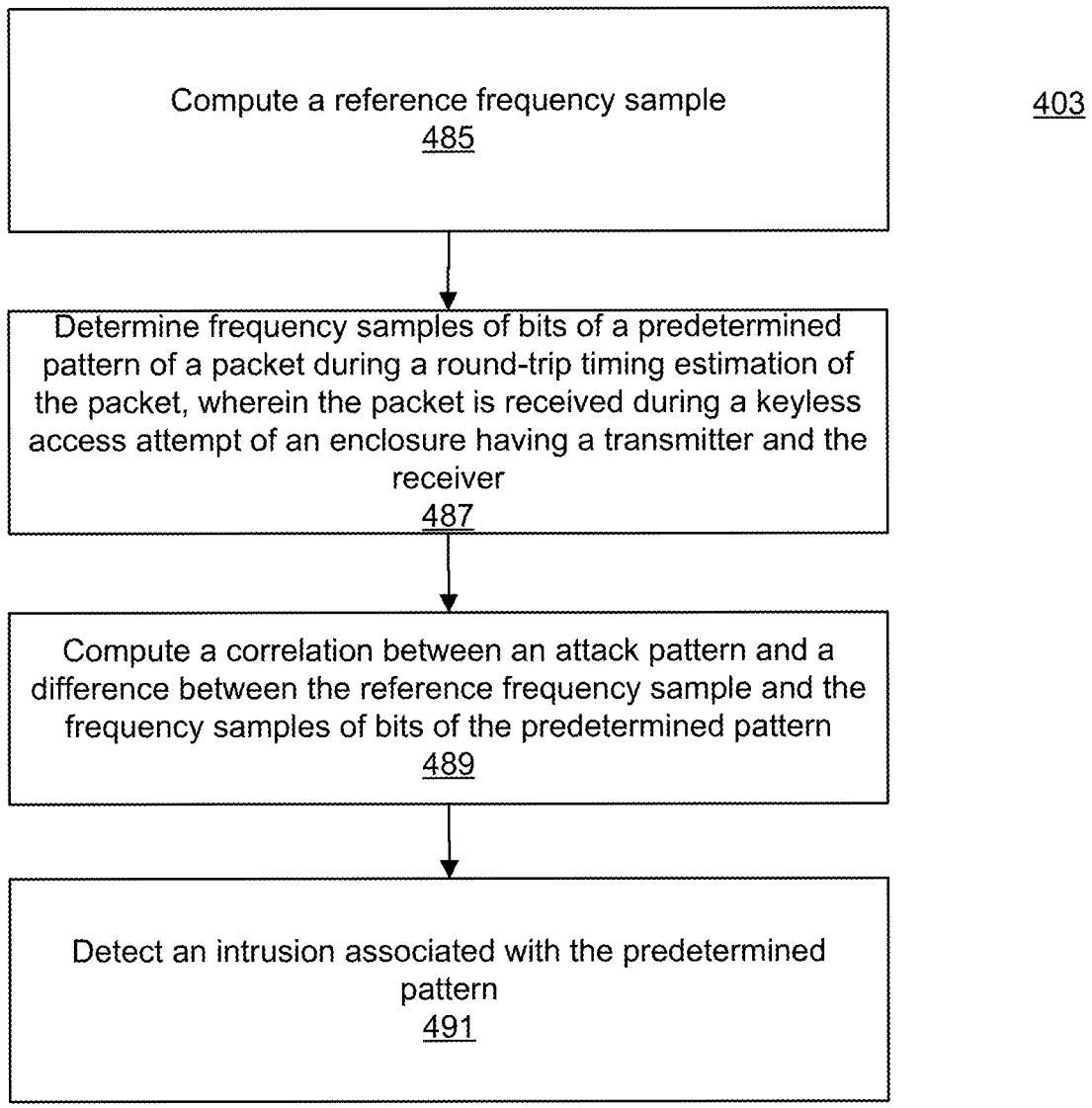
FIG. 4C is a flow diagram of a method of comparing the frequency of a received (e.g., measured) signal to the frequency of a reference signal for improved attack detection in round-trip timing (RTT) estimation, according to at least one embodiment.

FIG. 4C is a flow diagram of a method 403 of comparing the frequency of a received (e.g., measured) signal to the frequency of a reference signal for improved attack detection in round-trip timing (RTT) estimation, according to various embodiments. The method 403 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 403 is performed by the receiver 104 (e.g., as illustrated in FIG. 1A).

At operation 485, the processing logic computes a reference frequency sample based on a frequency sample of reference bits (referred to herein as "reference frequency sample" or "reference frequency samples"). In some embodiments, the processing logic can receive the reference frequency sample in an agreement transmitted to a receiver (e.g., the receiver 104 of FIG. 1A) (e.g., transmitted from the transmission device 102 of FIG. 1A). The reference frequency sample can be an expected frequency sample of bits within a predetermined pattern (e.g., a frame synchronization pattern) embedded within a packet (e.g., the packet illustrated in FIG. 3), which can be computed and stored on the receiver and/or the transmission device. In some embodiments, the agreement can be another packet, a notification, a message, etc., that includes information about the reference frequency samples and/or the predetermined pattern.

In an example, the reference frequency sample can be computed using an example mathematical equation, such as:

$$f_r = \text{angle}(\{r_n\}) - \text{angle}(\{r_{n-6}\}),$$

where $f_r$ is the reference FM frequency value and $r_n$ is reference IQ data.

In another example, the reference frequency sample can be computed using an example mathematical equation, such as:

$$f_r = \text{angle}(\{r_n\}) - \text{angle}(\{r_{n-4}\}).$$

As illustrated in FIG. 5, the reference frequency sample $f_r$ can be a frequency 507.

At operation 487, the processing logic determines frequency samples of bits within the predetermined pattern during a round-trip timing estimation of the packet. In some embodiments, the predetermined pattern is received as part of the packet during a keyless access attempt of a resource (e.g., the secured resource 50 of FIG. 1A) having a receiver (e.g., the receiver 104 of FIG. 1A). In some embodiments, the predetermined pattern is transmitted by a transmission device (e.g., transmitter) (e.g., the transmitter 102 of FIG. 1A). The processing logic can receive the predetermined pattern as part of the packet transmitted by the transmission device.

In some embodiments, to determine the frequency samples of bits within the predetermined pattern of the packet, the processing logic can extract frequency modulation (FM) sampled data from in-phase quadrature (IQ) data within the packet. The processing logic can detect the predetermined pattern within the packet (e.g., by looking for a peak using reference FM sampled data).

In an example, the processing logic can determine the frequency samples of bits within the predetermined pattern using an example mathematical equation, such as:

$$f_x = \text{angle}(\{x_n\}) - \text{angle}(\{x_{n-6}\}),$$

where $f_x$ is the frequency sample of bits within the predetermined pattern and $x_n$ is the IQ data within the predetermined pattern.

In another example, the processing logic can determine the frequency samples of bits within the predetermined pattern using an example mathematical equation, such as:

$$f_x = \text{angle}(\{x_n\}) - \text{angle}(\{x_{n-4}\}).$$

As illustrated in FIG. 5, the frequency $f_x$ of the FM sampled bits within the predetermined pattern can be a frequency 509.

At operation 489, the processing logic computes a correlation between an attack pattern and a difference between the reference frequency sample computed at operation 485 and the frequency samples of bits of the predetermined pattern determined at operation 487. In some embodiments, computing the correlation can include using pattern recognition to detect modifications (e.g., distortion 501 as illustrated in FIG. 5) of the frequency samples of bits within the predetermined pattern. For example, the processing logic can compute a value representing a difference between received frequency samples and the reference frequency samples. For example, the processing logic can compute the value, Δf, using an example mathematical equation, such as:

$$\Delta f = f_x - f_r,$$

where $f_x$ is the frequency samples of the received bits within the predetermined pattern, and $f_r$ is the frequency samples of the reference bits within the predetermined pattern.

As illustrated in FIG. 5 the frequency samples $f_x$ of the received bits within the predetermined pattern can be a frequency 509. The reference frequency samples $f_r$ can be a frequency 507. As illustrated in FIG. 6A, the value Δf representing the difference between the frequency samples of bits within the predetermined pattern and the reference frequency value can be referred to as an attack signature 611 (also shown as distortion 501 in FIG. 5).

In response to computing the above values, the processing logic can perform a correlation between an attack pattern and the values representing the difference between received frequency samples and the reference frequency samples. In some embodiments, the attack pattern can be pre-computed and can be stored on the receiver and/or the transmission device. In some embodiments, the processing logic can receive the attack pattern in an agreement transmitted to the receiver (e.g., transmitted from the transmission device). In some embodiments, the agreement can be another packet, a notification, message, etc., that includes information about the attack pattern, the reference frequency samples, and/or the predetermined pattern. For example, the processing logic can compute the correlation using an example mathematical equation, such as:

$$c_j = \Delta f \cdot p_j,$$

where $c_j$ is the correlation value, $\Delta f$ is the value representing the difference between received frequency samples and the reference frequency samples, and $p_j$ is the attack pattern described above.

Referring to FIG. 6C, the attack pattern $p_j$ can be illustrated as attack pattern 613.

At operation 491, the processing logic detects an intrusion associated with the predetermined pattern. In some embodiments, the processing logic detects the intrusion in response to determining a difference between the reference frequency sample and the frequency samples of bits of the predetermined pattern. For example, in response to determining at operation 430 that the computed value representing the difference between the second sum and the first sum is greater than the first threshold value, the processing logic can determine that the intrusion is a high pass filter intrusion. In some embodiments, in response to determining at operation 430 that the computed value representing the difference between the second sum and the first sum is less than the second threshold value, the processing logic can determine that the intrusion is one of: an early commit late detect (ECLD) intrusion or an early detect late commit (EDLC) intrusion, as described above. In some embodiments, in response to determining that the computed value representing the difference between the second sum and the first sum is less than or equal to the first threshold value and/or greater than or equal to the second threshold value, the processing logic can determine that there is no intrusion.

In some embodiments, in response to detecting the intrusion, the processing logic (e.g., the receiver) can send a notification (e.g., report, message, packet, etc.) to the transmission device, where the notification indicates that an intrusion associated with the predetermined pattern was detected by the receiver.

FIGS. 4A-4C are not intended to limit the methods described therein to certain combinations, permutations, or assignment of actors, i.e., whether a PD or CD actually performs a particular operation. Rather, they are meant to be indicative of some implementations of this disclosure, and one skilled in the art will recognize that some operations may be rearranged for particular applications, some operations need not always be performed, some operations may be omitted, etc.

FIG. 5 is a simplified graph illustrating the frequency of a transmitted signal over time, according to at least one embodiment. FIG. 5 is described with further details with respect to FIGS. 4A-4C herein above.

FIG. 6A is a simplified graph illustrating the frequency of an attack pattern signal over time, according to at least one embodiment. FIG. 6A is described with further details with respect to FIGS. 4A-4C herein above.

Figure 6B:
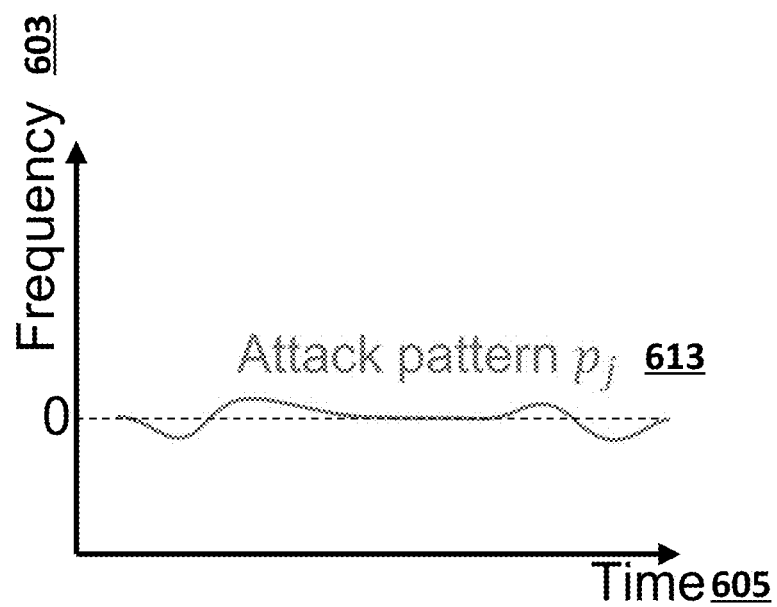
FIG. 6B is a simplified graph illustrating the frequency of an attack pattern signal over time, according to at least one embodiment.

FIG. 6B is a simplified graph illustrating the frequency of an attack pattern signal over time, according to at least one embodiment. FIG. 6B is described with further details with respect to FIGS. 4A-4C herein above.

It will be apparent to one skilled in the art that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C/PD mode-transition architecture described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments, the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the disclosure has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A wireless device comprising:
   a receiver adapted with Bluetooth® low energy (BLE) capability; and
   logic at least one of coupled to or integrated within the receiver, the logic to:
   determine frequency samples of bits of a predetermined pattern of a packet during a round-trip timing estimation of the packet, wherein the packet is received during a keyless access attempt of an enclosure having a transmitter and the receiver;
   compare, to a reference frequency sample, the frequency samples of bits of the predetermined pattern; and
   in response to determining a difference between the reference frequency sample and the frequency samples of bits of the predetermined pattern, detect an intrusion associated with the predetermined pattern.

2. The wireless device of claim 1, wherein to compare, to the reference frequency sample, the frequency samples of bits of the predetermined pattern, the logic is to:
   compute a first sum of the absolute value of the frequency samples of bits of the predetermined pattern;
   compute a second sum of the absolute value of a reference frequency sample value, wherein the reference frequency sample value is pre-computed and stored on the wireless device;
   compute a value representing a difference between the second sum and the first sum; and
   determine that the value representing the difference between the second sum and the first sum meets or exceeds a first threshold value or is less than a second threshold value.

3. The wireless device of claim 2, wherein to detect the intrusion associated with the predetermined pattern, the logic is to:
   in response to determining that the value representing the difference between the second sum and the first sum meets or exceeds the first threshold value, determine that the intrusion is a high pass filter intrusion; and
   in response to determining that the value representing the difference between the second sum and the first sum is less than the second threshold value, determine that the intrusion is one of: an early commit late detect (ECLD) intrusion or an early detect late commit (EDLC) intrusion.

4. The wireless device of claim 1, wherein to compare, to the reference frequency sample, the frequency samples of bits of the predetermined pattern, the logic is to:
   compute a value representing a difference between the frequency samples of bits of the predetermined pattern and a reference frequency sample value; and
   perform a correlation between the value representing the difference and an attack pattern.

5. The wireless device of claim 4, wherein the attack pattern is pre-computed and stored on the wireless device.

6. The wireless device of claim 1, wherein the intrusion is a high pass filter intrusion.

7. The wireless device of claim 1, wherein the intrusion is one of: an early commit late detect (ECLD) intrusion or an early detect late commit (EDLC) intrusion.

8. The wireless device of claim 1, wherein the logic is further to:
   send, from the receiver, a notification indicating the intrusion associated with the predetermined pattern.

9. A method comprising:
   determining, by logic of a receiver adapted with Bluetooth® low energy (BLE) capability, frequency samples of bits of a predetermined pattern of a packet during a round-trip timing estimation of the packet, wherein the packet is received during a keyless access attempt of an enclosure having a transmitter and the receiver;
   comparing, to a reference frequency sample, the frequency samples of bits of the predetermined pattern; and
   in response to determining a difference between the reference frequency sample and the frequency samples of bits of the predetermined pattern, detecting an intrusion associated with the predetermined pattern.

10. The method of claim 9, wherein comparing, to the reference frequency sample, the frequency samples of bits of the predetermined pattern comprises:
    computing a first sum of the absolute value of the frequency samples of bits of the predetermined pattern;
    computing a second sum of the absolute value of a reference frequency sample value, wherein the reference frequency sample value is pre-computed and stored on a wireless device comprising the receiver;
    computing a value representing a difference between the second sum and the first sum; and
    determining that the value representing the difference between the second sum and the first sum meets or exceeds a first threshold value or is less than a second threshold value.

11. The method of claim 10, wherein detecting the intrusion associated with the predetermined pattern comprises:
    in response to determining that the value representing the difference between the second sum and the first sum meets or exceeds the first threshold value, determining that the intrusion is a high pass filter intrusion; and
    in response to determining that the value representing the difference between the second sum and the first sum is less than the second threshold value, determining that the intrusion is one of: an early commit late detect (ECLD) intrusion or an early detect late commit (EDLC) intrusion.

12. The method of claim 9, wherein comparing, to the reference frequency sample, the frequency samples of bits of the predetermined pattern comprises:

computing a value representing a difference between the frequency samples of bits of the predetermined pattern and a reference frequency sample value; and performing a correlation between the value representing the difference and an attack pattern.

13. The method of claim 12, wherein the attack pattern is pre-computed and stored on a wireless device comprising the receiver.

14. The method of claim 9, wherein the intrusion is (i) a high pass filter intrusion, or (ii) one of: an early commit late detect (ECLD) intrusion or an early detect late commit (EDLC) intrusion.

15. The method of claim 9, further comprising:
sending, from the receiver, a notification indicating the intrusion associated with the predetermined pattern.

16. A system comprising:
an antenna;
a transmission device that is to transmit a packet;
a receiving device adapted with Bluetooth® low energy (BLE) capability to receive a predetermined pattern of the packet during a keyless access attempt of an enclosure having the transmission device and the receiving device; and
logic at least one of coupled to or integrated with the receiver, the logic to:
determine frequency samples of bits of the predetermined pattern of the packet during a round-trip timing estimation of the packet;
compare, to a reference frequency sample, the frequency samples of bits of the predetermined pattern; and
in response to determining a difference between the reference frequency sample and the frequency samples of bits of the predetermined pattern, detect an intrusion associated with the predetermined pattern.

17. The system of claim 16, wherein to compare, to the reference frequency sample, the frequency samples of bits of the predetermined pattern, the logic is to:

compute a first sum of the absolute value of the frequency samples of bits of the predetermined pattern;
compute a second sum of the absolute value of a reference frequency sample value, wherein the reference frequency sample value is pre-computed and stored on the receiving device;
compute a value representing a difference between the second sum and the first sum; and
determine that the value representing the difference between the second sum and the first sum meets or exceeds a first threshold value or is less than a second threshold value.

18. The system of claim 17, wherein to detect the intrusion associated with the predetermined pattern, the logic is to:
in response to determining that the value representing the difference between the second sum and the first sum meets or exceeds the first threshold value, determine that the intrusion is a high pass filter intrusion; and
in response to determining that the value representing the difference between the second sum and the first sum is less than the second threshold value, determine that the intrusion is one of: an early commit late detect (ECLD) intrusion or an early detect late commit (EDLC) intrusion.

19. The system of claim 16, wherein to compare, to the reference frequency sample, the frequency samples of bits of the predetermined pattern, the logic is to:
compute a value representing a difference between the frequency samples of bits of the predetermined pattern and a reference frequency sample value; and
perform a correlation between the value representing the difference and an attack pattern.

20. The system of claim 16, wherein the logic is further to:
send, from the receiver, a notification indicating the intrusion associated with the predetermined pattern.

* * * * *